United States Patent
Elwell et al.

(10) Patent No.: US 6,854,545 B1
(45) Date of Patent: Feb. 15, 2005

(54) METHOD AND APPARATUS FOR DISPLAYING LOGOS ON GRILLE INSERT

(75) Inventors: James P. Elwell, Ankeny, IA (US); Ben F. Conkey, Nevada, IA (US)

(73) Assignee: Putco, Inc., Story City, IA (US)

( * ) Notice: Subject to any disclaimer, the term of this patent is extended or adjusted under 35 U.S.C. 154(b) by 92 days.

(21) Appl. No.: 10/371,947

(22) Filed: Feb. 20, 2003

(51) Int. Cl.[7] .......................... B60K 11/04; G09F 21/04
(52) U.S. Cl. ........................................ 180/68.6; 40/643
(58) Field of Search ................................ 180/68.4, 68.6; 165/98, 99; 160/DIG. 1; 40/643, 644; D12/162–165; 296/77.1; 293/115

(56) References Cited

U.S. PATENT DOCUMENTS

| | | | | |
|---|---|---|---|---|
| 1,787,035 A | * | 12/1930 | Davis | 180/68.6 |
| D155,321 S | * | 9/1949 | Phillips | D12/171 |
| RE34,907 E | * | 4/1995 | Gross | 180/68.6 |
| D420,961 S | * | 2/2000 | Sousamian | D12/163 |
| 6,131,681 A | * | 10/2000 | Nelson et al. | 180/68.1 |
| D456,322 S | * | 4/2002 | Horowitz | D12/163 |
| D488,111 S | * | 4/2004 | Elwell | D12/163 |
| 2003/0160465 A1 | * | 8/2003 | Taljaard | 293/115 |
| 2004/0007408 A1 | * | 1/2004 | Seffernick et al. | 180/68.6 |

FOREIGN PATENT DOCUMENTS

CA 632381 * 12/1961

OTHER PUBLICATIONS

Printout from Internet Web Site www.autoanything.com dated 9/04 showing grille inserts.*
Printout from Internet Web Site http://shop.store.yahoo.com dated 9/04 showing grille inserts.*
Printout from Internet Web Site http://shop.store.yahoo.com dated 9/04 showing grille inserts.*

* cited by examiner

Primary Examiner—Bryan R Fishmann
(74) Attorney, Agent, or Firm—McKee, Voorhees & Sease, P.L.C.

(57) ABSTRACT

A grille insert is provided for attaching in superimposed relationship over a vehicle grille. The grille insert includes a grille blank in the form of a sheet member having an outer perimeter. A plurality of decorative openings extend through the grille blank and a first flat surface and a second flat surface are provided on the grille blank. A first label is attached to the first flat surface and has a first logo and printed thereon and a second label is attached to the second flat surface and has a second logo imprinted thereon.

12 Claims, 5 Drawing Sheets

METHOD AND APPARATUS FOR DISPLAYING LOGOS ON GRILLE INSERT

BACKGROUND OF THE INVENTION

The present invention relates to a method and apparatus for displaying logos on grille insert.

In recent times it has become popular to mount grille inserts over the vehicle grille in various vehicles. Grille inserts attach over the front of the vehicle grille and include numerous decorative openings and shapes therein.

Depending upon a particular vehicle grille involved, the grille inserts are sometimes unitary in construction; sometimes comprised of two elongated horizontally extending grille inserts, or in some cases the grille inserts are in four separate quadrants of the vehicle grille.

Therefore a primary object of the present invention is the provision of an improved method and apparatus for displaying logos on a grille insert.

A further object of the present invention is the provision of a grille insert which has decorative apertures therein and which includes flat surfaces thereon for receiving various logos of popular personalities, celebrities, or companies.

A further object of the present invention is the provision of a method and apparatus for displaying logos on a grille insert that is attractive in appearance, efficient in operation, and durable in use.

BRIEF SUMMARY OF THE INVENTION

The foregoing objects may be achieved by a grille insert adapted to be attached in superimposed relationship over a vehicle grille. The grille insert comprises a grille blank in the form of a sheet member having an outer perimeter. A plurality of decorative openings extend through the grille blank and are shaped to form a decorative pattern on the face of the grille blank. These decorative openings may take various shapes including punched circles, flame shaped openings, or other decorative openings. A first flat surface is provided on the grille blank and a second flat surface is provided on the grille blank. A first label is attached to the first flat surface and has a first logo imprinted thereon. A second label is attached to the second flat surface and has a second logo imprinted thereon.

The method of the present invention involves attaching a first sheet member having a first logo imprinted thereon to the first flat surface of the grille insert. A second sheet member having a second logo imprinted thereon is attached to the second flat surface. The grille insert is then attached in superimposed relationship over the vehicle grille surface in a position wherein the first and second logos are visible from the front of the vehicle.

According to another feature of the invention, only a single flat surface may be provided on the grille blank and only a single label is attached to this flat surface.

According to another feature of the invention, when two flat surfaces are provided, one of them may be in a circle and the other may be in a rectangle shape.

According to another feature of the invention, one of the flat surfaces may be larger than the other of the flat surfaces.

According to another feature of the invention, the first and second flat surfaces together comprise a surface area which is substantially smaller than the surface area of the decorative openings within the grille blank.

DETAILED DESCRIPTION OF THE PREFERRED EMBODIMENT

Figure 1:
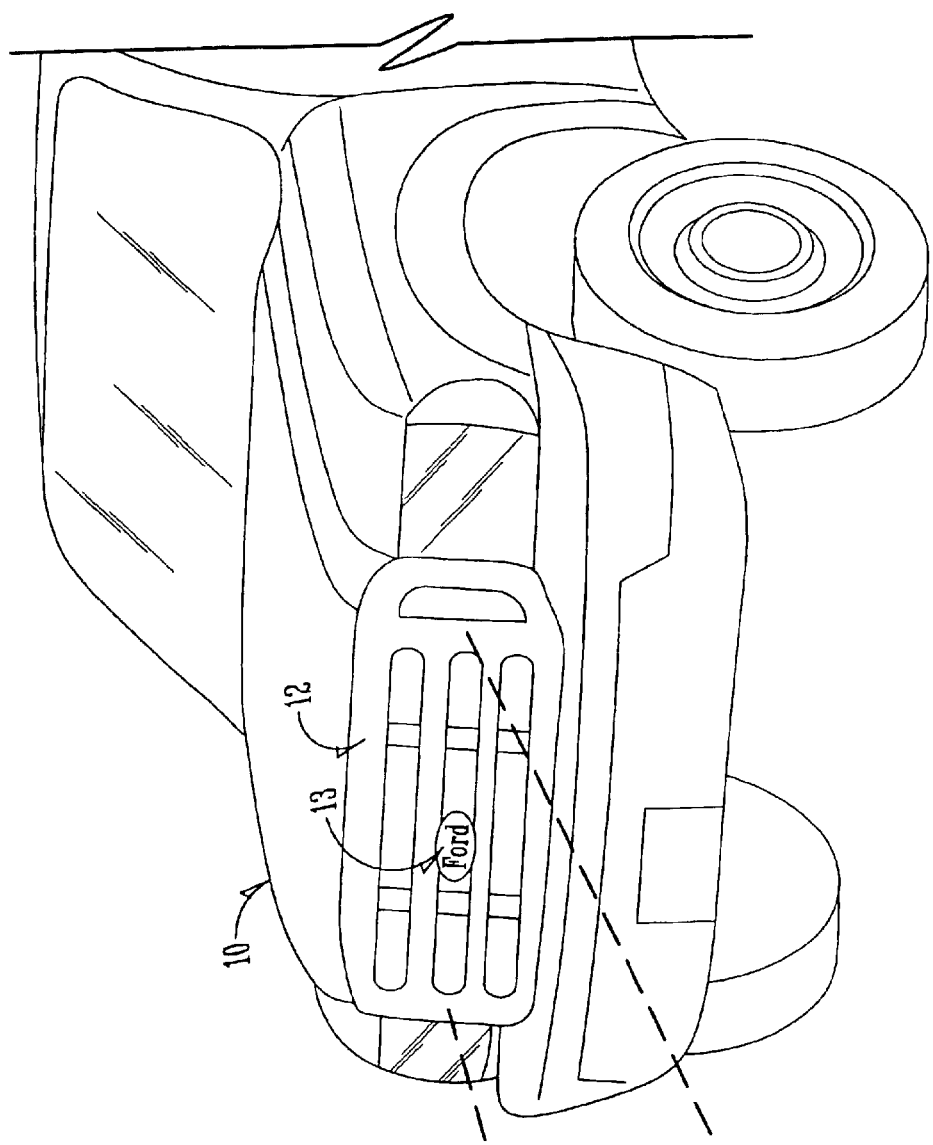
FIG. 1 is an exploded perspective view showing the vehicle grille, the grille insert, and the labels that are attached over the front of the two surfaces on the grille insert.
Figure 2:
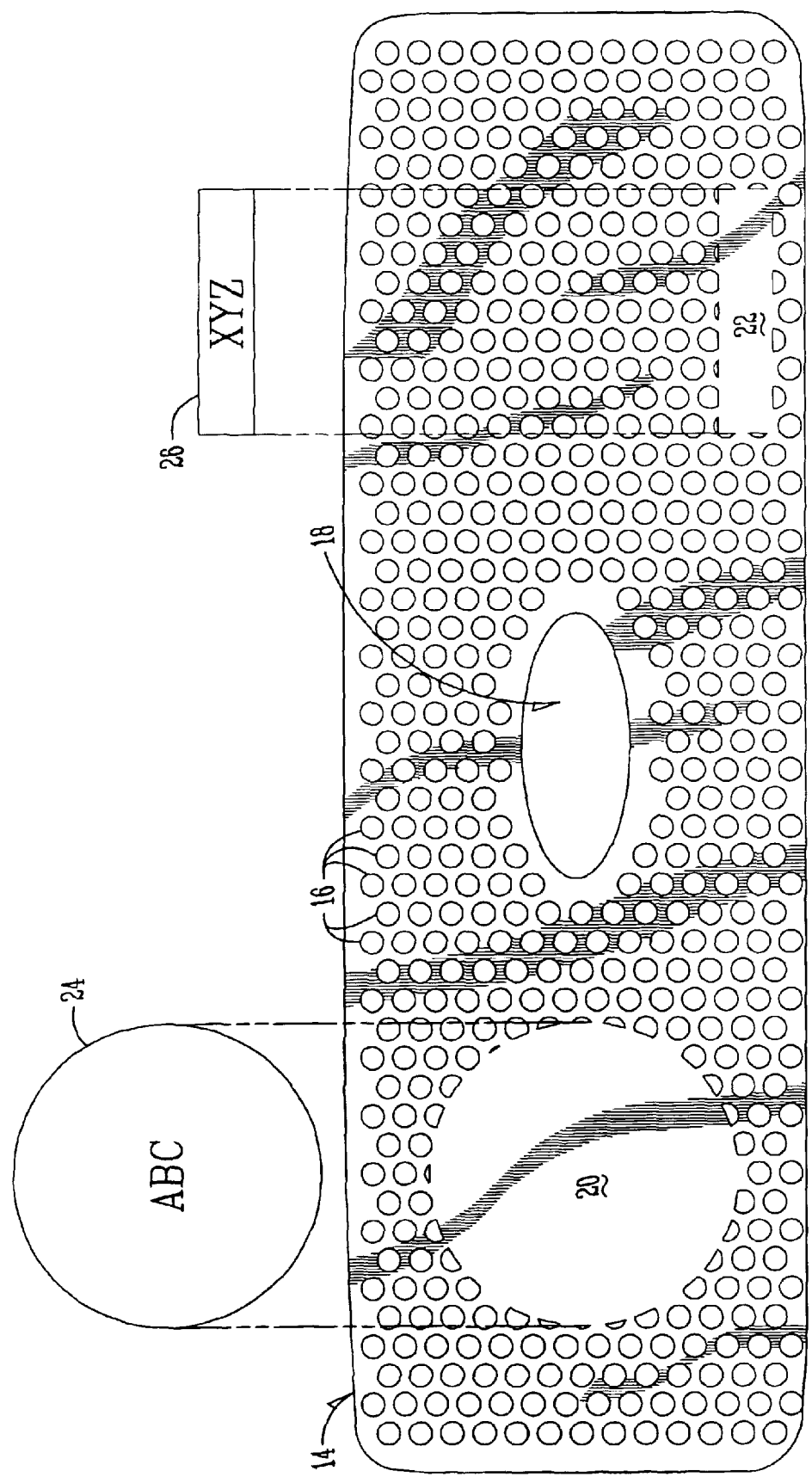
FIG. 2 is a front elevational view of the grille insert shown in FIG. 1.

Referring to FIGS. 1 and 2 a vehicle 10 includes a vehicle grille 12 at its front surface. The grille 12 often has a vehicle logo centrally located thereon. In FIG. 1 the logo for Ford is shown, but the logo could equally as well be the logo for other makes or brands of vehicles.

The numeral 14 represents a grille insert which may be attached over these front surface of the vehicle grille. Grille insert 14 includes a plurality of decorative openings 16 therein. These decorative openings are shown to be a punched pattern of holes in the grille insert 14, but these openings may also be of a variety shapes and sizes to provide the desired decorative effect. Usually the grille insert 14 includes a central opening 18 which is adapted to register with the vehicle logo 13 so that the vehicle logo 13 can be displayed through the grille insert 14.

Grille insert 14 includes a flat circular surface 20 which does not include any perforations therein. It also includes a second flat surface 22 which is rectangular in shape and which does not include any perforations there through. A first logo sticker 24 is shaped to fit over the first flat surface and be adhered thereto and a second logo sticker 26 is shaped to fit the rectangular surface 22 and be adhered thereto. The method for adhering the stickers 24, 26 to the surface 20 may be done by any of a number of adhesives which are available on the market.

Figure 3:
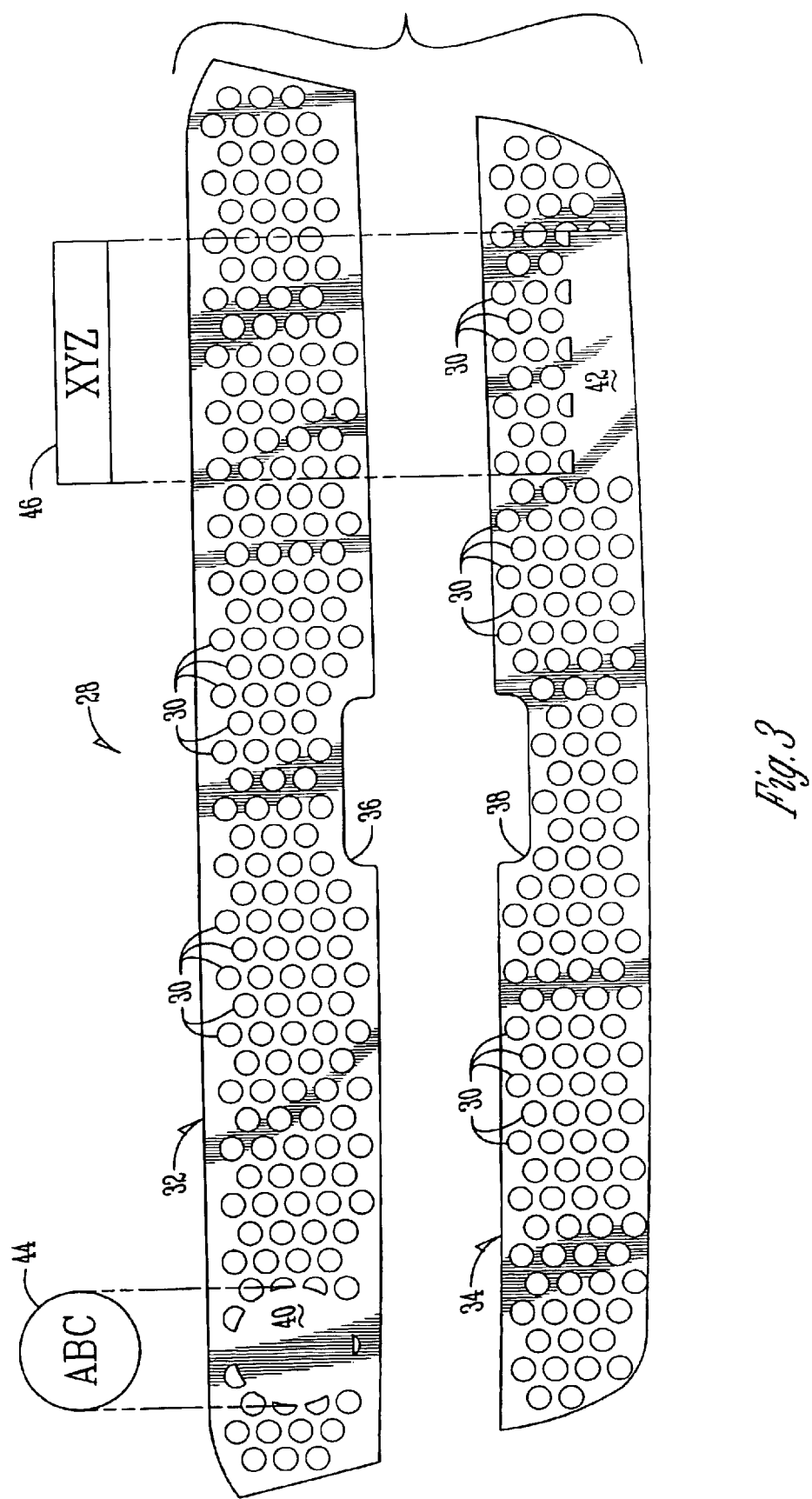
FIG. 3 is a front elevational view of a grille insert comprising two horizontally elongated blank members.

Referring to FIG. 3 a modified form of the invention is shown and is designated by the numeral 28. Grille blank 28 is comprised of two pieces, each of which is a horizontally elongated member. This grille is adapted to be mounted to the front of a vehicle having a horizontal bar extending horizontally across the center thereof usually with a logo mounted on the horizontal bar. The grille insert blank 28 includes a plurality of decorative openings 30 therein and includes an upper half 32 and a lower half 34 that are placed above and below the horizontal bar of the vehicle. Upper and lower halves 32, 34 each include vehicle logo cutouts 36, 38 which are adapted to surround the vehicle logo so that it can be seen through the grille insert 28.

On the upper half 32 is a first flat surface 40 and on the lower half 34 is a rectangular flat surface 42. A logo sticker 44 is adapted to fit the shape of the first flat surface 40 and be adhered thereto. A second logo sticker 46 is adapted to fit over the second flat surface 42 and be adhered thereto.

Figure 4:
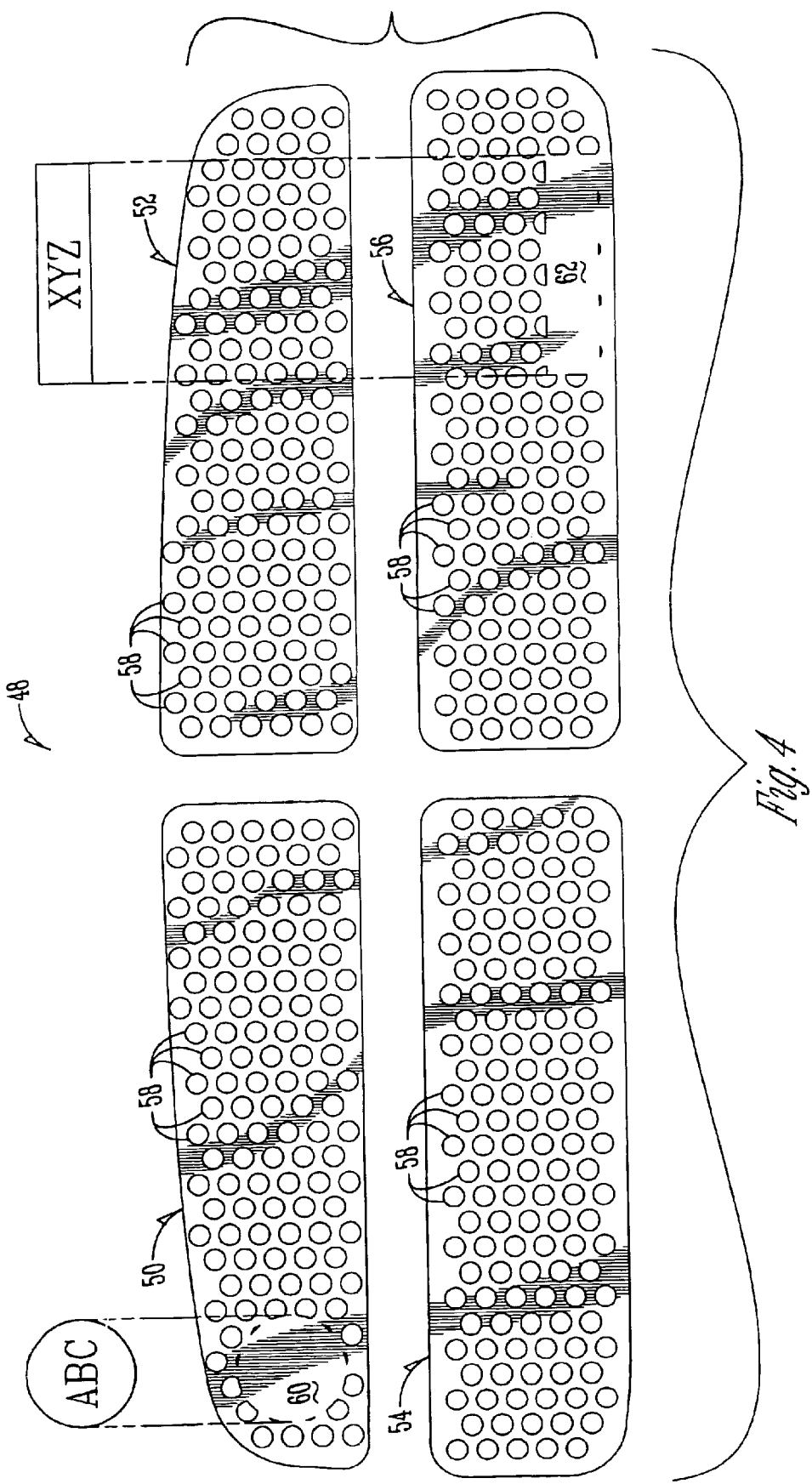
FIG. 4 is a frontal elevational view of a grille insert comprising four grille blanks that are mounted to the front of the vehicle.

Referring to FIG. 4 a further modified form of the invention is designated by the numeral 48. Grille blank 48 comprises four grille pieces 50, 52, 54, and 56. Each of the grille pieces 50, 52, 54, and 56 includes a plurality of decorative openings 58 therein. A first flat surface 60 is provided on the upper left hand grille piece 50 and a second flat surface 62 is provided on the lower right grille piece 56. The grille pieces 50, 52, 54, and 56 are adapted to be superimposed over a four piece vehicle grille that is separated by a horizontally centered bar and a vertically centered bar.

Figure 5:
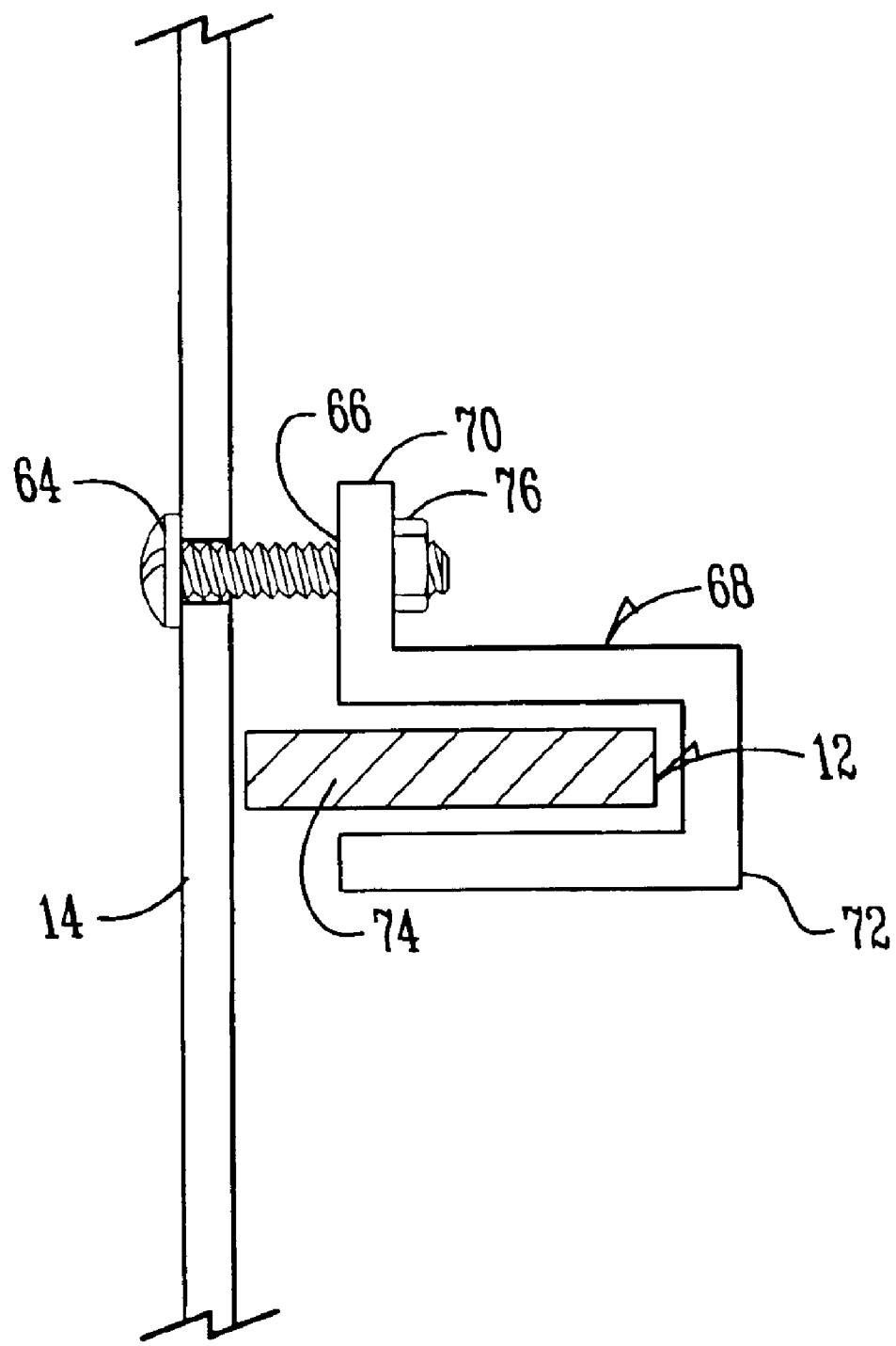
FIG. 5 is a sectional view showing the method and bracket for mounting the grille insert to the vehicle grille.

All of the grille blanks 14, 28, and 48 are secured to the vehicle grille in the same manner, and the bracket for doing so is shown in FIG. 5 with respect to grille insert 14. A bolt 64 extends through a hole in the grille insert 14. Bolt 64 also extends through a hole 66 in a bracket 68. Bracket 68 includes a vertical member 70 having the hole 66 extending there through and a unshaped member 72 which surrounds a horizontal member 74 of the vehicle grille 12. A nut 76 is threaded over the end of bolt 64 and tightening of nut 76 causes the unshaped portion 72 to pull the grille insert 14 into tight attachment with the vehicle grille 12. This means of securement may be used in several places to attach the grille insert 14 to the vehicle grille 12 or to similarly attach the grille blanks shown in FIGS. 3 and 4 to the vehicle grille.

The present invention permits the display of various logos on stickers that are attached to the flat surfaces on the front of the grille blank. This has been found to be highly desirable among owners of vehicles, and various stickers can be used to display the logos of personalities, celebrities, and companies as desired by the vehicle owner. Similarly the decorative openings in the grille inserts can be varied infinitely to provide the desired visual effect.

In the drawings and specification there has been set forth a preferred embodiment of the invention, and although specific terms are employed, these are used in a generic and descriptive sense only and not for purposes of limitation. Changes in the form and the proportion of parts as well as in the substitution of equivalents are contemplated as circumstances may suggest or render expedient without departing from the spirit or scope of the invention as further defined in the following claims.

What is claimed is:

1. A grille insert for attaching in superimposed relationship over a vehicle grille, the grille insert comprising:
    a grille blank in the form of a sheet member having an outer perimeter;
    a plurality of decorative openings extending through the grille blank and being shaped to form a decorative pattern on the face of the grille blank;
    a first flat surface on the grille blank;
    a second flat surface on the grille blank;
    a first label attached to the first flat surface and having a first logo imprinted thereon;
    a second label attached to the second flat surface and having a second logo imprinted thereon.

2. A grille insert according to claim 1 wherein the first flat surface is larger than the second flat surface.

3. A grille insert according to claim 1 wherein the first flat surface is circular in shape and the second flat surface is rectangular in shape.

4. A grille insert according to claim 1 wherein the plurality of decorative openings, the first flat surface, and the second flat surface each comprise first, second, and third areas respectively of the grille blank, the first area being larger than the second and third areas combined.

5. A grille insert according to claim 4 wherein the second area is larger than the third area.

6. A method for displaying logos on a vehicle grille on the front of a vehicle, the vehicle grille having a vehicle grille surface, the method comprising:
    forming a grille blank in the form of a sheet member having a plurality of decorative openings extending through the grille blank, and having a first flat surface and a second flat surface;
    attaching a first sheet member having a first logo imprinted thereon to the first flat surface;
    attaching a second sheet member having a second logo imprinted thereon to the second flat surface;
    attaching the grille blank in superimposed relation over the vehicle grille surface in a position wherein the first and second logos are visible from the front of the vehicle.

7. A method according to claim 6 wherein the step of forming a grille blank comprises making the first flat surface cover a first area of the grille blank, making the second flat surface cover a second area of the grille blank, and making the plurality of decorative openings cover a decorative area of the grille blank that is larger in size than the first and second areas combined.

8. A method according to claim 7 and further comprising making the second area larger than the first area.

9. A method according to claim 7 and further comprising making the first flat surface round and making the second flat surface rectangular in shape.

10. A method according to claim 7 and further comprising making the first flat area round in shape.

11. A method according to claim 7 and further comprising making the first flat area rectangular in shape.

12. A grille insert for attaching in superimposed relationship over a vehicle grille, the grille insert comprising:
    a grille blank having an outer perimeter, an internal side and an external side;
    a plurality of decorative openings extending through the grille blank and being shaped to form a decorative pattern on the face of the grille blank;
    the grille blank attached in superimposed relation over the vehicle grille with the internal side facing the vehicle grille and with the external side facing the opposite direction;
    a logo member attached to the external side of the grille blank, the logo member carrying a representation of a logo.

* * * * *